United States Patent
Stanley

[19]

[11] Patent Number: 5,829,945
[45] Date of Patent: Nov. 3, 1998

[54] ROLL-OUT TILT DECK FOR TRUCK

[76] Inventor: George William Stanley, P.O. Box 418, Lively, Ontario, Canada, P0M 2E0

[21] Appl. No.: 741,546

[22] Filed: Oct. 31, 1996

[30] Foreign Application Priority Data

Nov. 2, 1995 [GB] United Kingdom .................. 9522518

[51] Int. Cl.$^6$ ..................................................... B60P 1/04
[52] U.S. Cl. ...................... 414/477; 298/19 V; 414/522; 414/537
[58] Field of Search .................................. 414/471, 494, 414/477–480, 537, 538, 522; 298/19 V, 21 V

[56] References Cited

U.S. PATENT DOCUMENTS

| | | | |
|---|---|---|---|
| 1,457,575 | 6/1923 | Jansen | 298/19 V |
| 1,537,457 | 5/1925 | Bryar | 414/494 |
| 2,091,068 | 8/1937 | Girl | 414/522 |
| 2,391,310 | 12/1945 | Heller | 414/522 X |
| 3,006,487 | 10/1961 | Gelli | 414/522 |
| 3,559,826 | 2/1971 | Abromavage et al. | 414/537 |
| 3,687,314 | 8/1972 | Haugland | 414/522 |
| 3,768,673 | 10/1973 | Nydam et al. | 414/522 |
| 4,616,373 | 10/1986 | Perez | 414/537 X |
| 4,681,371 | 7/1987 | Leonard | 298/1 A |
| 4,685,857 | 8/1987 | Goeser et al. | 414/522 |
| 4,740,132 | 4/1988 | Peyre | 414/538 X |
| 4,749,317 | 6/1988 | Daniel | 414/538 X |
| 4,813,841 | 3/1989 | Fischer | 414/477 |
| 4,824,158 | 4/1989 | Peters et al. | 414/522 X |
| 4,889,377 | 12/1989 | Hughes | 414/522 X |
| 5,046,913 | 9/1991 | Domek et al. | 414/522 |
| 5,332,276 | 7/1994 | Blodgett, Jr. | 296/26 |
| 5,393,192 | 2/1995 | Hall et al. | 414/537 |
| 5,603,600 | 2/1997 | Egan et al. | 414/477 X |
| 5,636,902 | 6/1997 | Norbury | 414/477 X |

FOREIGN PATENT DOCUMENTS

| | | | |
|---|---|---|---|
| 260213 | 5/1964 | Australia | 414/480 |
| 2259688 | 3/1993 | United Kingdom | 414/477 |

*Primary Examiner*—David A. Bucci
*Attorney, Agent, or Firm*—Anthony Asquith & Co.

[57] ABSTRACT

A roll-out deck apparatus is fitted to a pick-up truck, for loading/unloading a snowmobile etc. The deck may be tilted about a hinge pivot at the rear edge of the truck, whereby the deck forms a ramp, up and down which the snowmobile may be manipulated. The apparatus includes an electric winch, located at the front end of the deck, for raising and lowering the deck, about the hinge pivot. A sub-frame of the apparatus is directly hinged to the rear edge of the truck bed; the sub-frame can undergo pivoting or tilting movement about the hinge pivot. A deck-frame is telescopable with respect to the sub-frame, but is otherwise locked to the sub-frame, whereby when the sub-frame tilts the deck-frame tilts in unison.

10 Claims, 14 Drawing Sheets

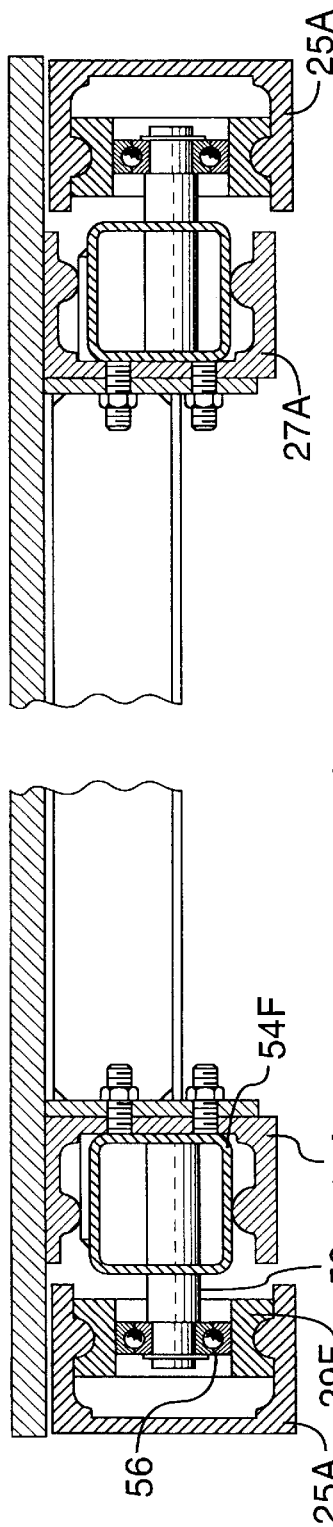
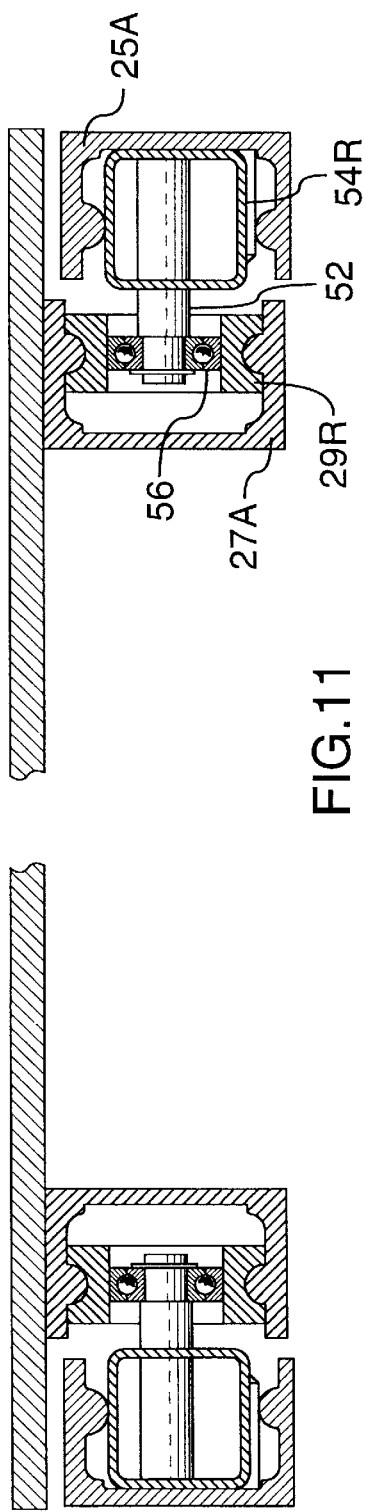
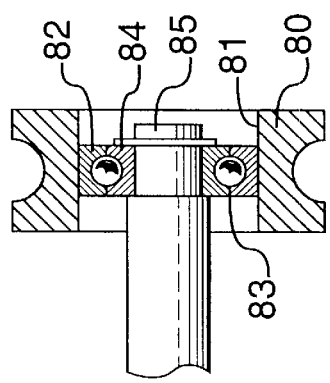
FIG. 10
FIG. 11
FIG. 11a

5,829,945

ROLL-OUT TILT DECK FOR TRUCK

This invention relates to roll-out decks for small trucks, such as pick-up trucks. Such decks are provided for the purpose, for example, of enabling an item such as a snowmobile to be placed into and out of the truck.

The invention provides a roll-out deck apparatus which may be tilted about a hinge pivot at the rear edge of the truck, whereby the deck forms a ramp, up and down which the snowmobile etc may be manipulated. The apparatus includes a means, for example an electric winch, located at the front end of the deck, for raising and lowering the deck, about the hinge pivot.

The apparatus includes a sub-frame and a deck-frame. The sub-frame is the component of the apparatus that is directly hinged to the rear edge of the truck bed; the sub-frame can undergo no other mode of movement, other than pivoting or tilting movement about the hinge pivot. The deck-frame is arranged for relative telescoping with respect to the sub-frame, but is otherwise locked to the sub-frame, whereby when the sub-frame tilts the deck-frame tilts in unison.

DETAILED DESCRIPTION OF PREFERRED EMBODIMENTS

By way of further explanation of the invention, exemplary embodiments of the invention will now be described with reference to the accompanying drawings, in which:

FIG. 10 is a cross-section on line X—X of FIG. 1A;

FIG. 11 is a cross-section on line Y—Y of FIG. 1A;

FIG. 11a is a cross-section of a roller or wheel assembly;

The apparatuses shown in the accompanying drawings and described below are examples which embody the invention. It should be noted that the scope of the invention is defined by the accompanying claims, and not necessarily by specific features of exemplary embodiments.

Figure 1:
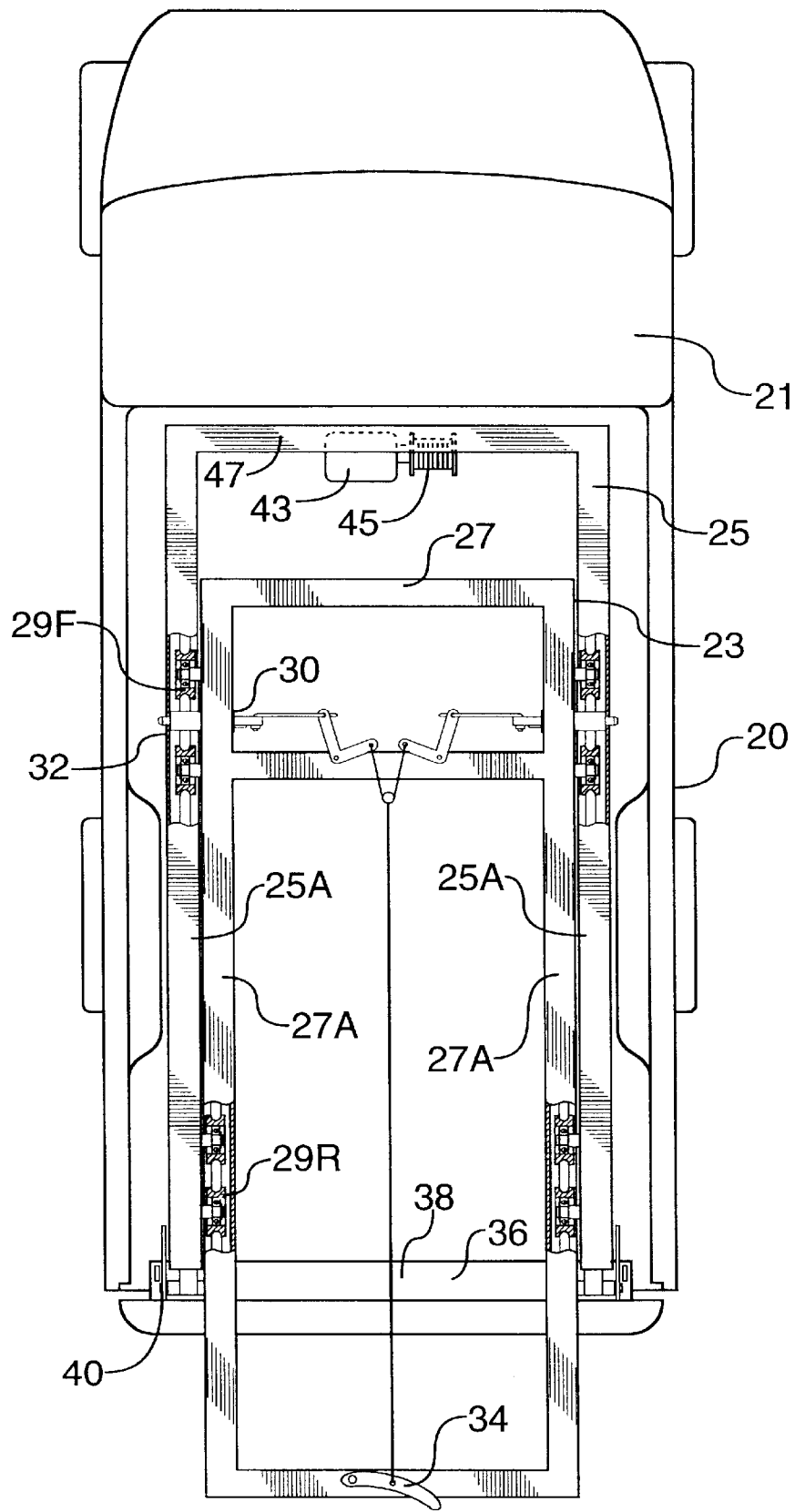
FIG. 1 is a diagrammatic plan view of a roll-out tilt deck apparatus that embodies the invention, in use on a pick-up truck.
Figure 1A:
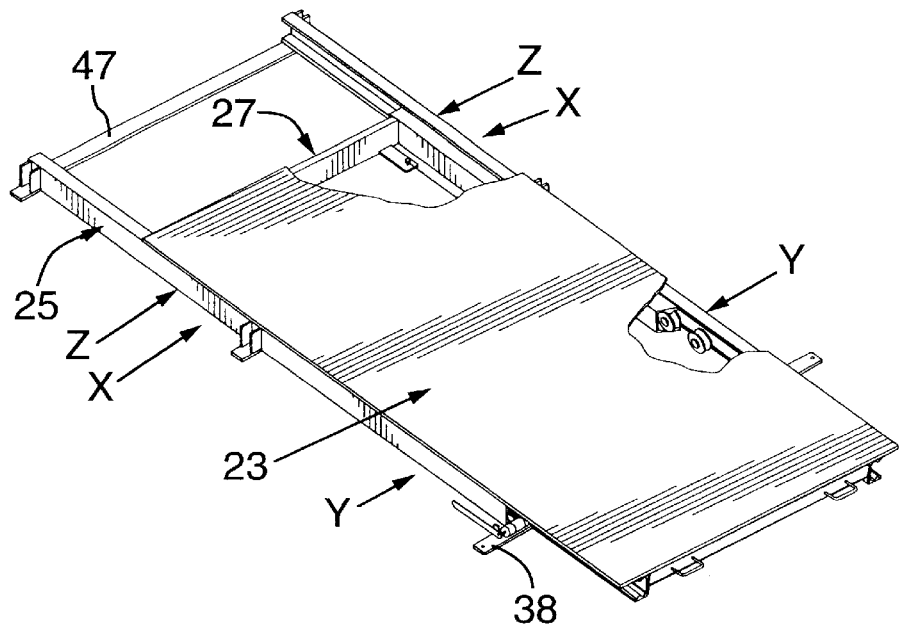
FIG. 1A is a pictorial view of the components of the apparatus.
Figure 1B:
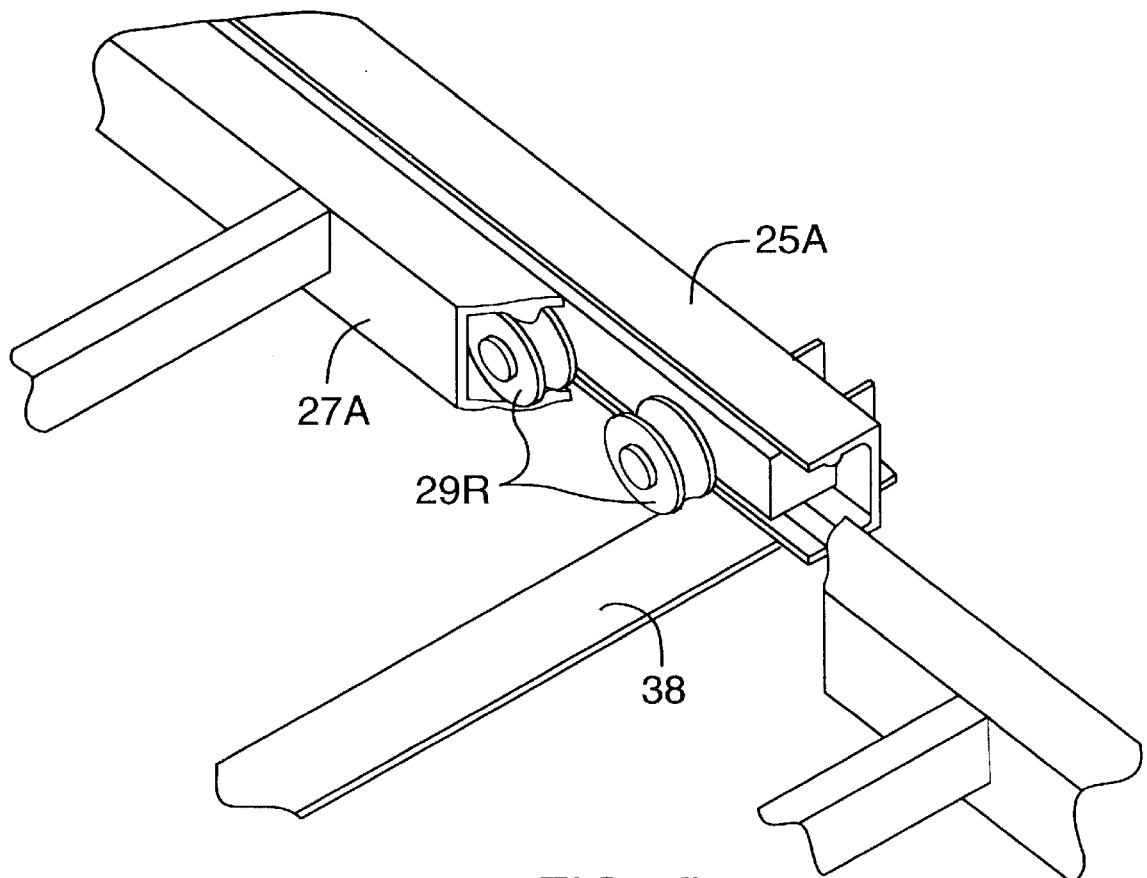
FIG. 1B is a close-up of an area of FIG. 1A.

In FIG. 1, a pick-up truck 20 is of the usual kind, having an open load-space or bed behind the cab 21.

Into this space is placed the roll-out tilt-deck apparatus 23. The apparatus includes a sub-frame 25 and a deck-frame 27. The frames include respective longitudinal structural side members 25A,27A. These side members are profiled to receive rollers 29.

The front rollers 29F are axled to the deck-frame side members 27A, and run in guides in the sub-frame side members 25A. The rear rollers 29R are axled to the sub-frame members 25A, and run in guides in the deck-frame members 27A. The sub-frame and the deck-frame therefore can be telescoped together, and apart, in the axial or longitudinal direction relative to the truck 20. The rollers and guides are of such serviceability and robustness that the deck-frame 27 remains freely slidable upon the sub-frame 25 over a long service life, and yet the two frames are firmly locked to each other against all other modes of relative movement, other than the telescoping.

Spring-loaded locking pins 30 are provided, which are mounted in the deck-frame 27, and which are engageable with corresponding holes 32 in the sub-frame 25. When the pins are held clear of the sub-frame, the deck-frame is able to slide freely; when the pins are released, the pins engage the next available hole 30, and thereby lock the deck-frame to the sub-frame, against further sliding. The pins 30 are held clear of the sub-frame, or allowed to spring into the holes 32, by operation of a handle 34.

A pivot hinge support 36 comprises a cross-beam 38, on which are mounted two pivot-hinges 40. The purpose of these hinges is to enable the sub-frame 25 to pivot thereabout. The axis of the hinge is located at the back of the bed of the truck, whereby the front of the sub-frame can be raised and lowered.

For raising and lowering the front end of the sub-frame, an electric winch 43 is provided, attached into the truck in behind the cab, at the front of the bed. A cable 45 from the winch is secured to a cross-bar 47 at the front of the sub-frame 25.

In a first manner of use, the deck-frame is slidable by hand action. The operator releases the pins 30, by turning the lever 34 (the lever 34 may be turned over-centre, thereby holding the pins in the retracted position) and then pulls out the deck, by hand. The deck slides out easily on the sub-frame by virtue of the rollers 29.

Figure 2:
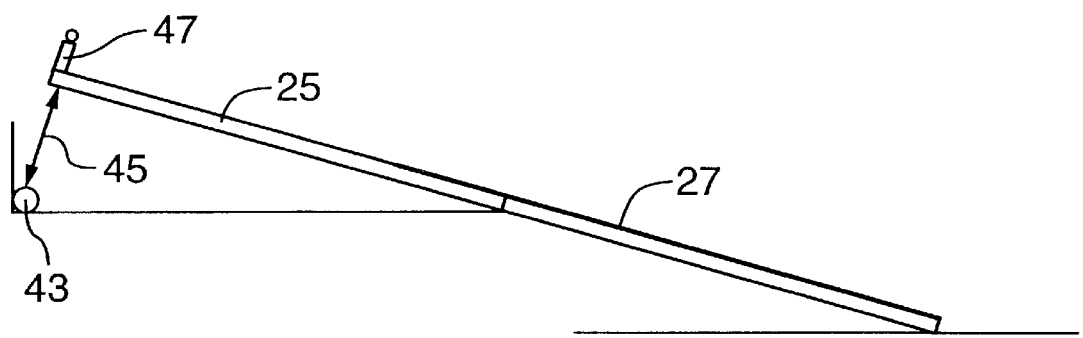
FIG. 2 is a diagram showing the manner of tilting of the roll-out deck.
Figure 3:
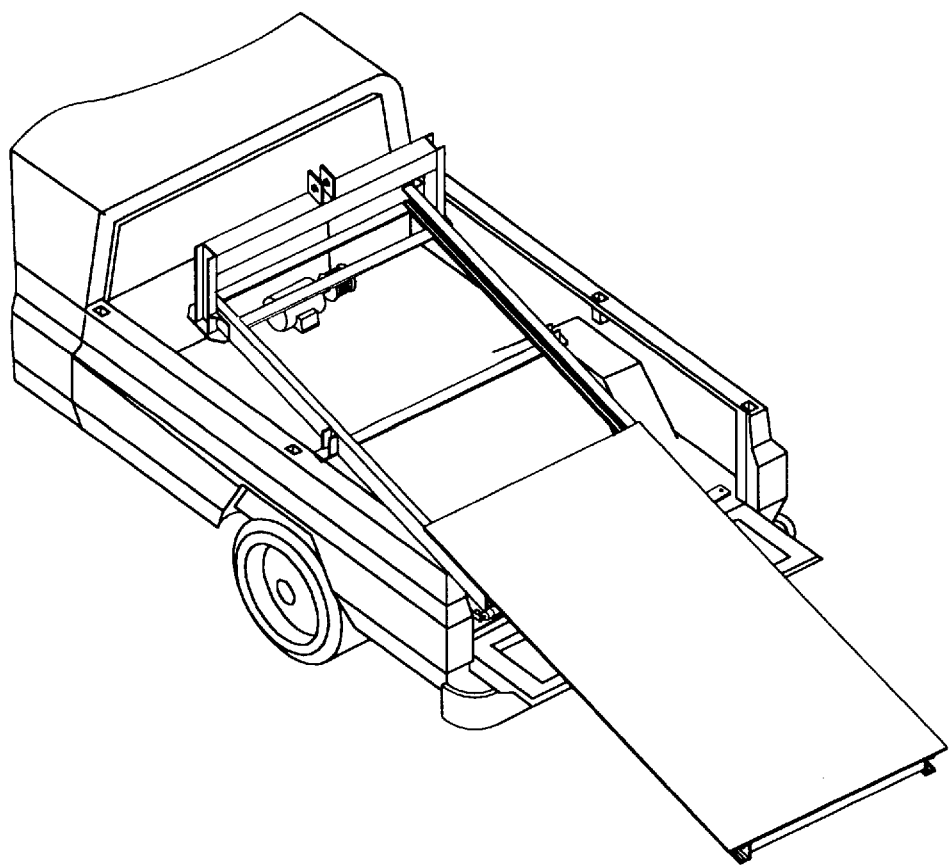
FIG. 3 is a pictorial view of the apparatus, in use on a truck, shown in the tipped and rolled out condition.

With the deck fully out, or with the deck locked at some intermediate position, the weight of the deck, and of an object carried upon the deck, forces the rear end of the deck downwards, thereby urging the front end of the sub-frame upwards, and putting tension in the cable 45. The operator may switch on the winch, whereby the cable is paid out, allowing the front of the sub-frame to rise, and correspondingly the rear of the deck to descend, to the position as shown in FIGS. 2 and 3.

The deck-frame and the sub-frame remain both in the same plane as each other at all times. When the deck-frame is horizontal, the sub-frame is horizontal too; when the deck-frame is tilted at an angle, the sub-frame lies tilted at that same angle.

Figure 4:
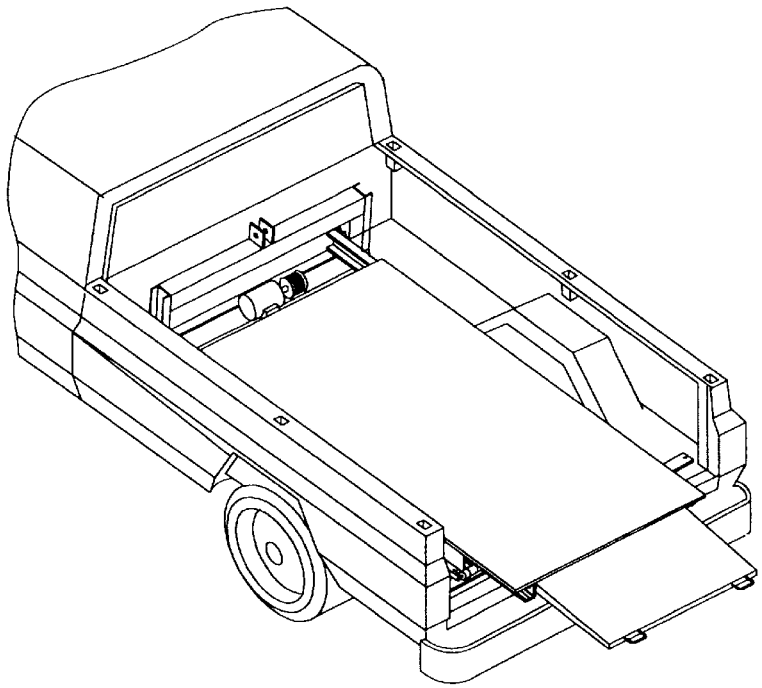
FIG. 4 is a view of the apparatus of FIG. 3, showing the rolled-out but not tipped condition.
Figure 5:
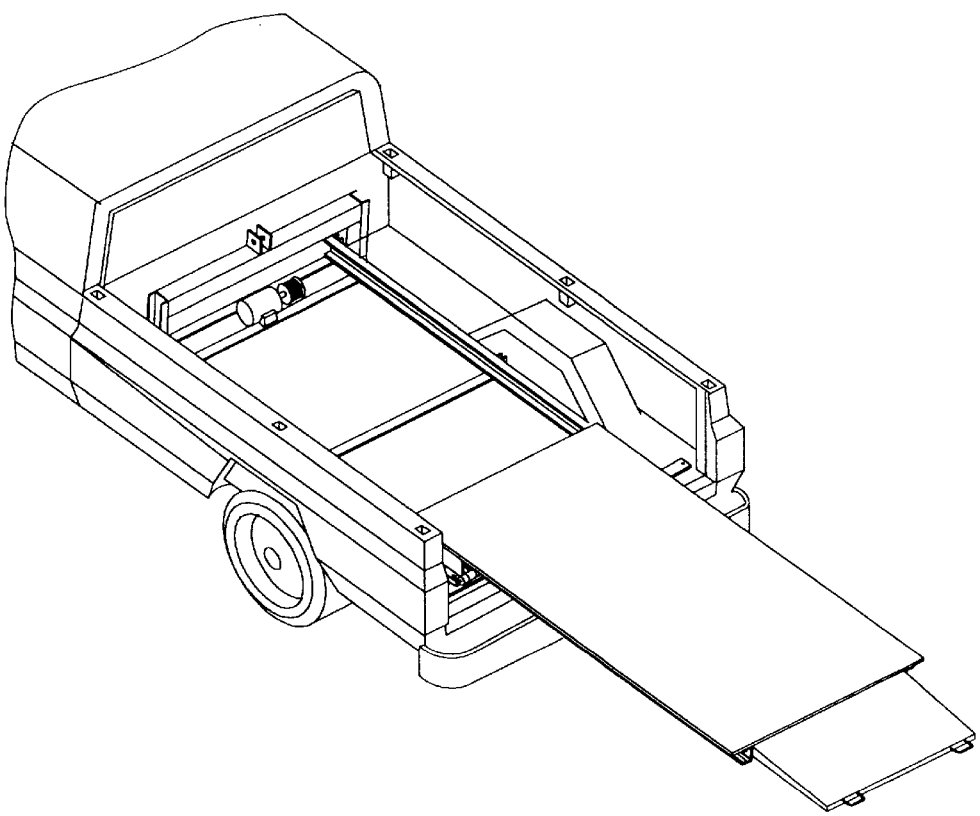
FIG. 5 is a view of the apparatus of FIG. 3, showing the apparatus in the stowed condition.

When raising the deck, the winch is operated to draw down the front of the sub frame, thus raising the rear of the deck, until the deck is once more horizontal (FIG. 5). Then, the operator may slide the deck into the truck, by hand, manipulating the lever 34 as required, until the deck is once more inside the truck (FIG. 4.)

Figure 6:
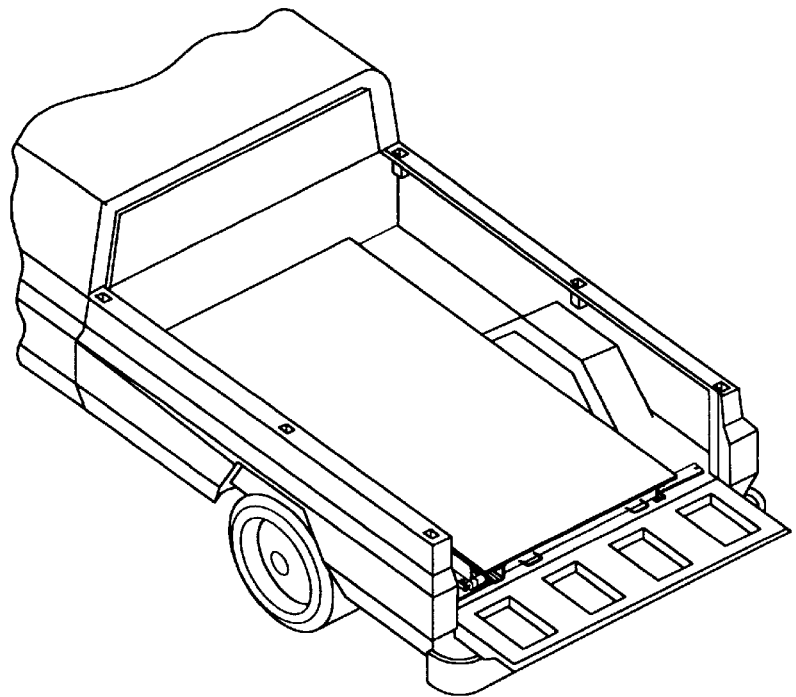
FIG. 6 is a view corresponding to FIG. 5, in which the apparatus does not include a tailgate.
Figure 7:
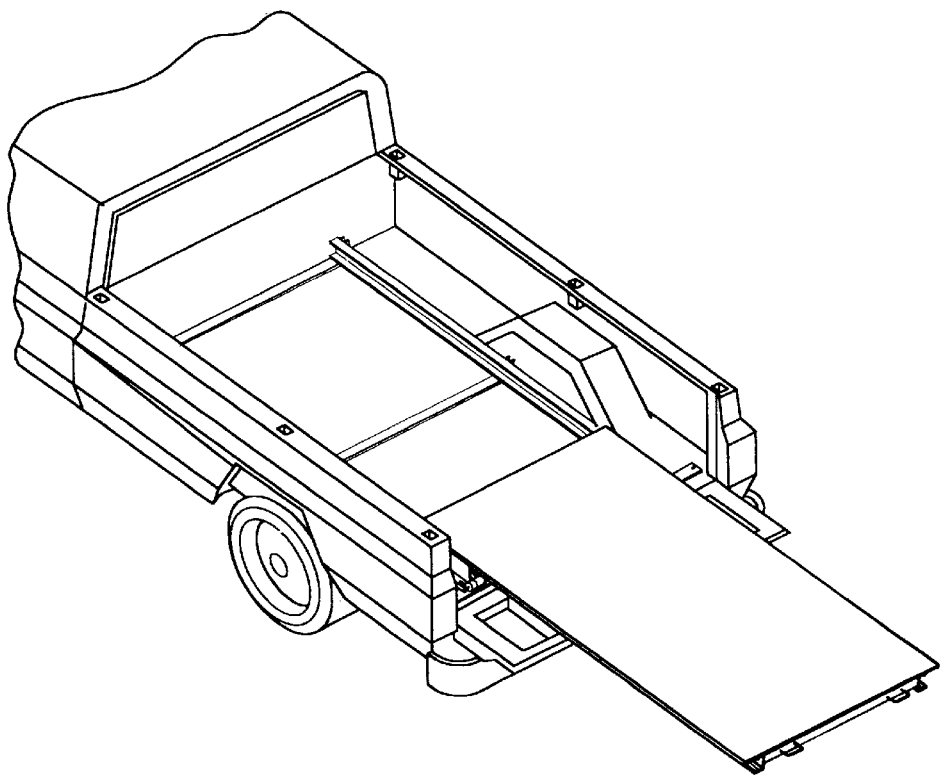
FIG. 7 is a view corresponding to FIG. 4 of the apparatus of FIG. 6.
Figure 8:
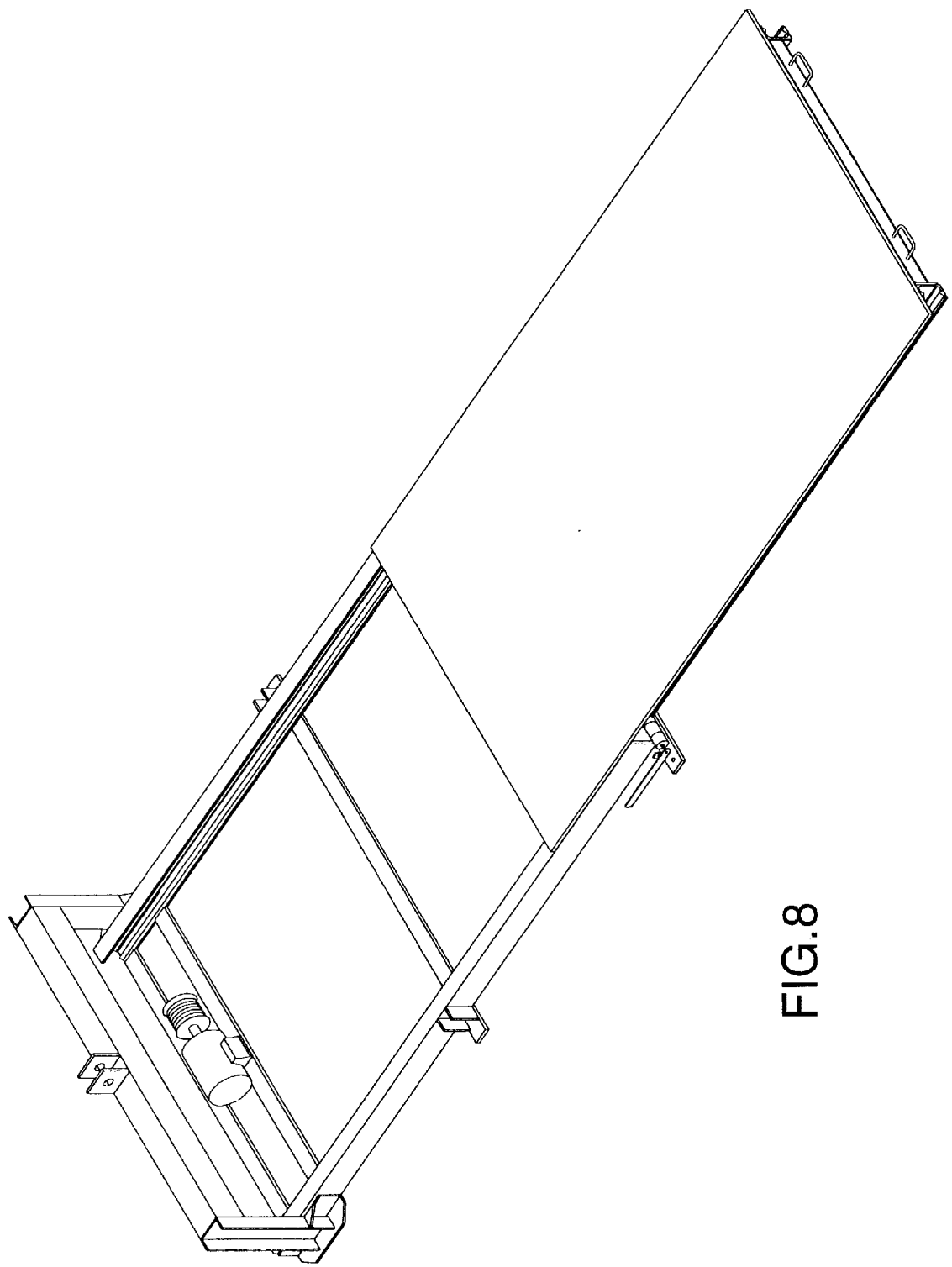
FIG. 8 is a view of the components of the apparatus of FIG. 7.
Figure 9:
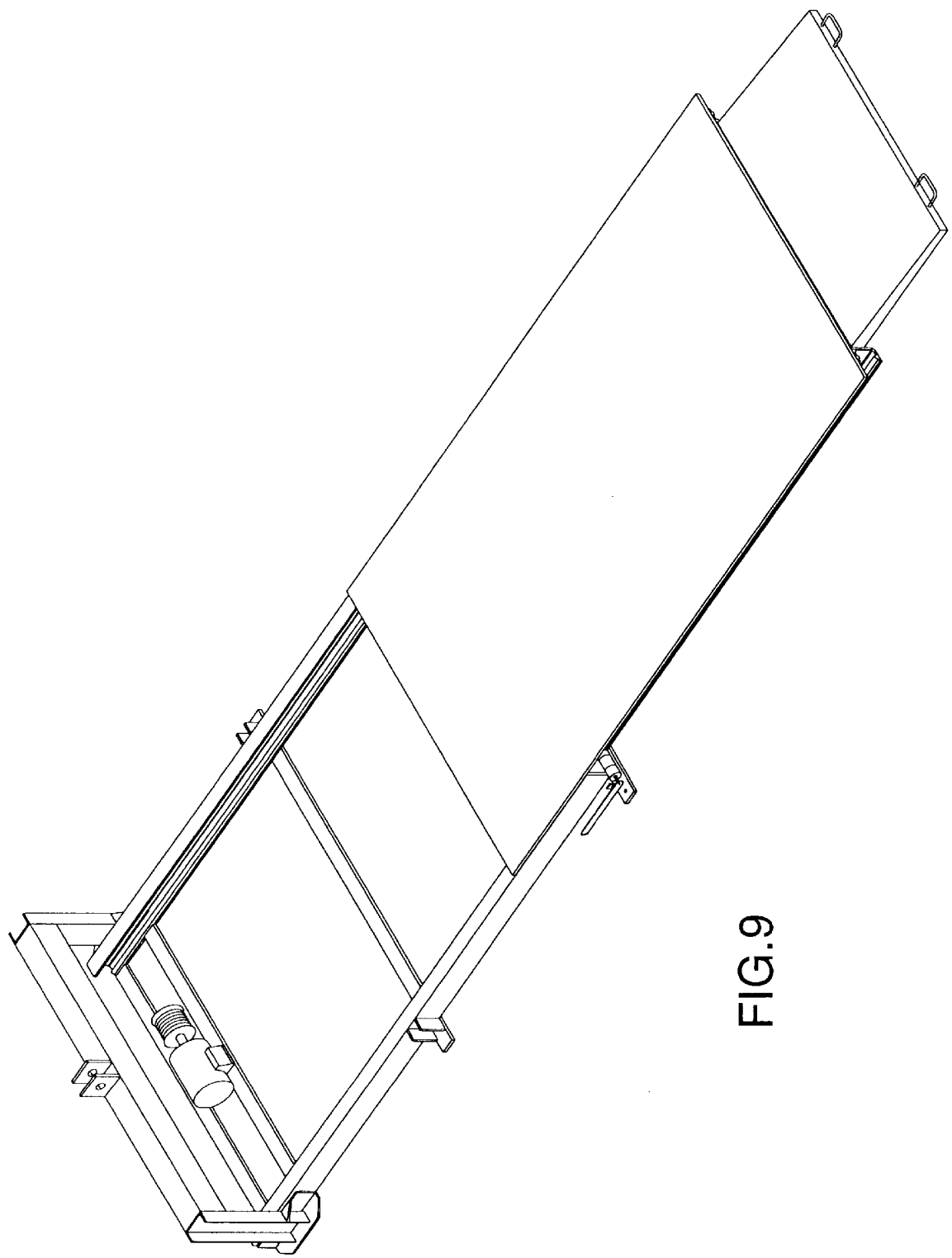
FIG. 9 is a view of the components of the apparatus of FIG. 4.

In FIG. 4, the rear end of the deck includes an extension 49 which doubles as a tailgate. The extension may be locked into a co-planar configuration with the deck for raising and lowering, and then pivoted so as to serve as a conventional tailgate. FIGS. 6 and 7 show a deck in the extended and retracted positions, in which the tailgate of the truck remains in place. FIGS. 8 and 9 show the dimensional difference made by the extension/tailgate.

Figure 2A:
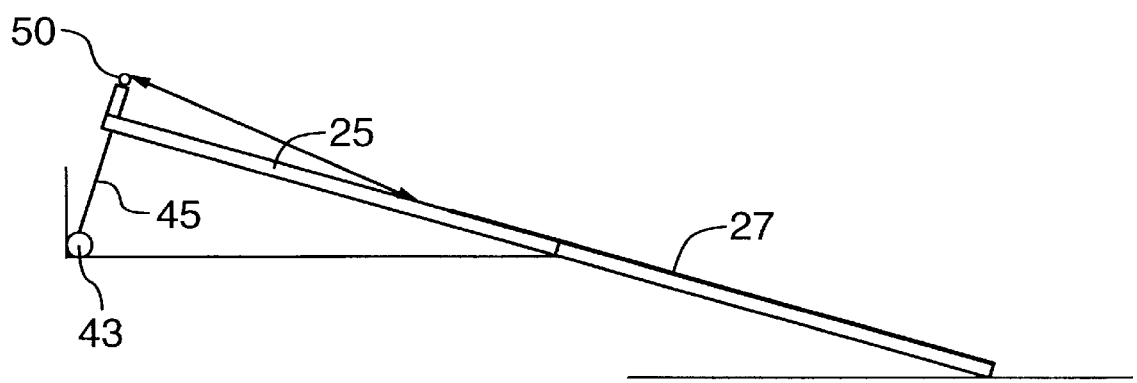
FIG. 2A is a diagram showing another manner of tilting the deck.

In the pulley-mode or manner of use, as shown in FIG. 2a, the cable passes over a pulley 50 located on the cross-bar 47, and is attached to the deck-frame 27. Now, when the winch is operated (starting from the condition in which the rear end of the deck is on the ground), the rear end of the deck is raised, and the deck is winched up the sub-frame, more or less simultaneously, depending on the weight distribution of the deck. Thus, the operational step of raising the deck, and the operational step of sliding the deck inward, are merged in FIG. 2a.

In a third manner of use, the cable is attached to a load, such as a snowmobile, that is to be loaded into the truck. Now, commencing from the rear end of the deck being on the ground, and the snowmobile just started up onto the deck, and the cable attached to the snowmobile, operating the winch now draws the snowmobile up the (inclined) deck. The deck should be locked to the sub-frame, by locking the pin 30 into a suitable one of the holes 32, during this phase. Then, with the pins retracted, further operation of the winch raises the deck, with the load thereupon, and draws the loaded deck into the truck.

The roll-out deck may also be used in other ways: for example, the deck may be simply slid out, while remaining horizontal, i.e with no tilting, whereby the deck may serve as a table or bench.

Some of the details of the apparatus will now be described. FIGS. 10 and 11 are cross-sections of the deck- and sub-frames, showing the front and rear rollers and their associated supports. The axles 52 of the rollers are built into square-section tubing pieces 54F,54R which are bolted to the appropriate location on the longitudinal members 25A,27A of the frames.

As may be seen, the members 25A,27A are formed as extrusions in aluminum, and are profiled to serve as guide tracks for the wheels of the rollers. Bumps in the channel-shaped members serve to constrain corresponding grooves in the profile of the roller wheels.

The wheels of the rollers 29 may be of metal, or may be cast in, for example, polyurethane. Axle bearings 56 for the wheels may be cast directly into a moulded urethane wheel, which makes for an inexpensive yet durable wheel structure.

FIG. 11 a shows a variation of the roller and bearing assembly. Here the roller 80 is made of solid metal, and is provided with a straight-through bore 81. The outer race 82 of the bearing 83 is an interference press-fit into the bore 81, and is inserted therein down to a convenient pre-set depth. The inner race 84 of the bearing is an interference press-fit to the spindle 85. The bore 81 being straight-through, it is easy to manufacture the bore to an accurate size diametrally. Therefore, the press fit can be relied upon to hold the bearing firmly in place.

Figure 12:
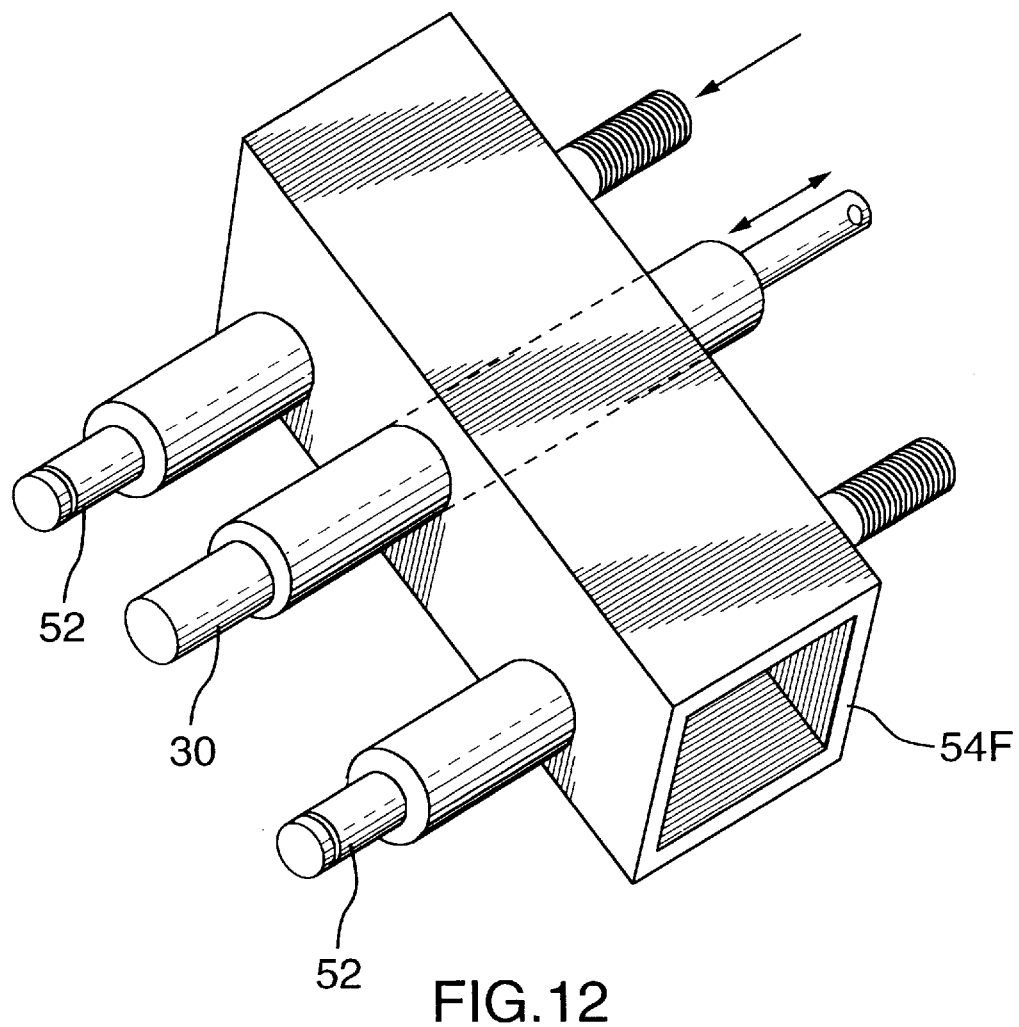
FIG. 12 is a view of some of the components of the apparatus shown in FIG. 10.
Figure 13:
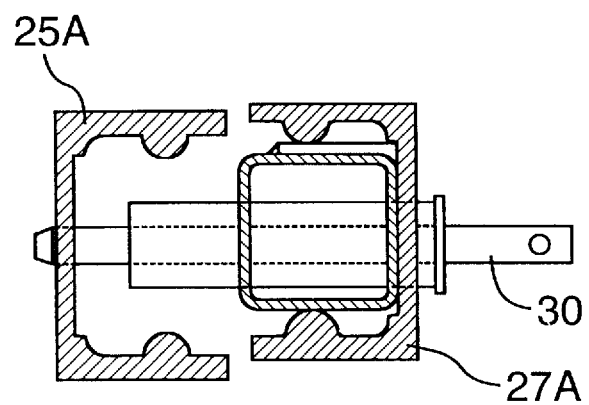
FIG. 13 is an end elevation of some of the components shown in FIG. 10.

FIGS. 12 and 13 show the manner of supporting the front rollers. It will be noted that the spring loaded locking pin 30 is mounted in the same section of square tubing 54F as the roller axles.

Figure 14:
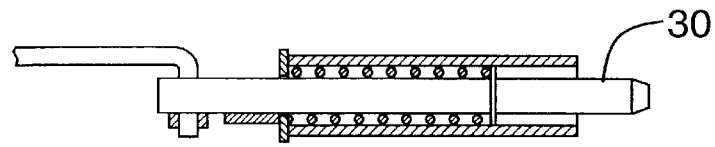
FIG. 14 is a portion of a cross-section on line Z—Z of FIG. 1A.
Figure 15:
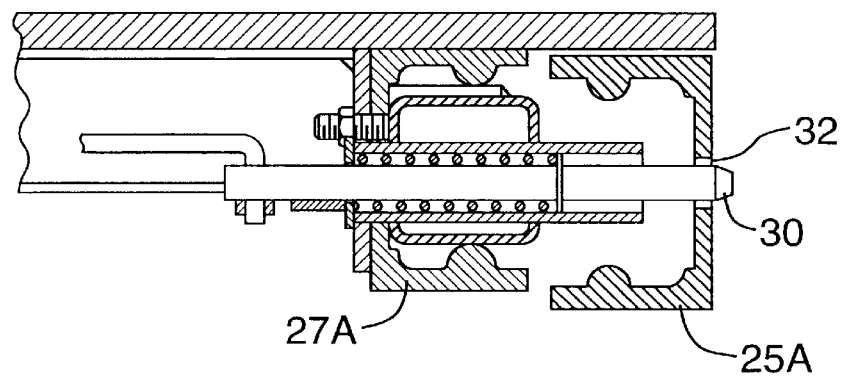
FIG. 15 is another portion of a cross-section on line Z—Z of FIG. 1A.

FIGS. 14 and 15 show the details of the structure of the locking pins 30, and the manner whereby the pins lock the two frames 25,27 together.

Figure 16:
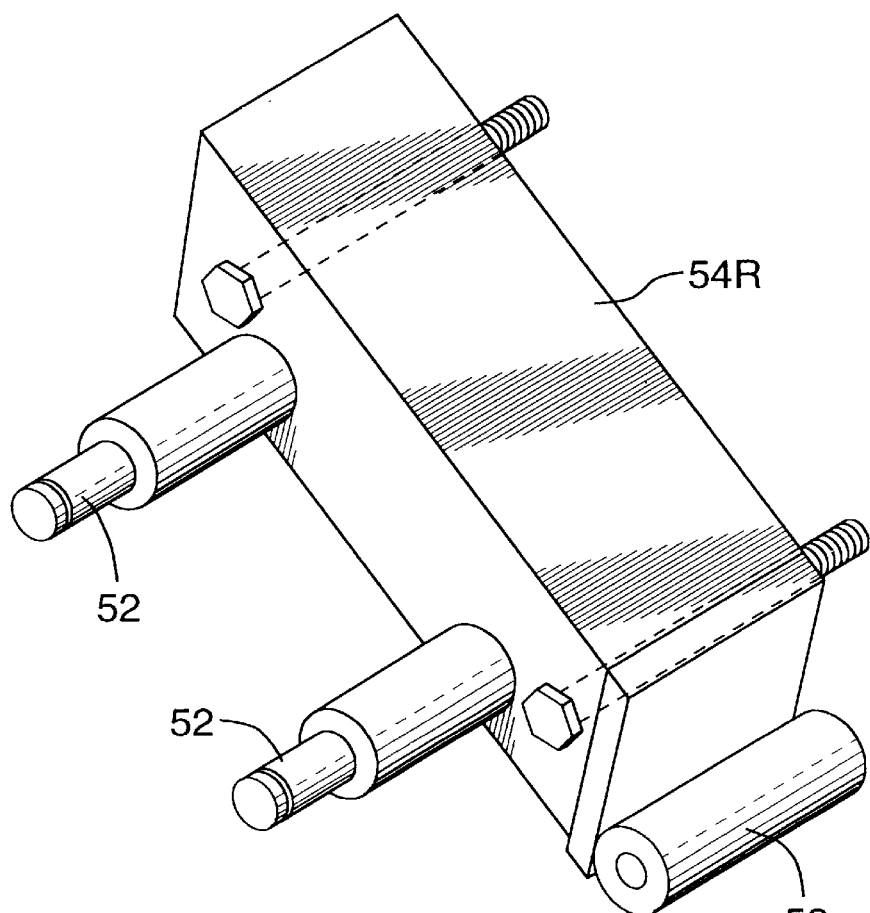
FIG. 16 is a view of some of the components as shown in FIG. 15.

FIGS. 11 and 16 show the mounting of the rear rollers. Each pair of rear rollers are secured to a respective square tube 54R, bolted to the sub-frame member 25A. In this case, i.e the rear roller mounting, there is no spring loaded pin, but there is a piece welded to the rear end of the square tube 54R, i.e the piece 58: this piece carries the hinge pin of the sub-frame pivot hinge 40.

Figure 17:
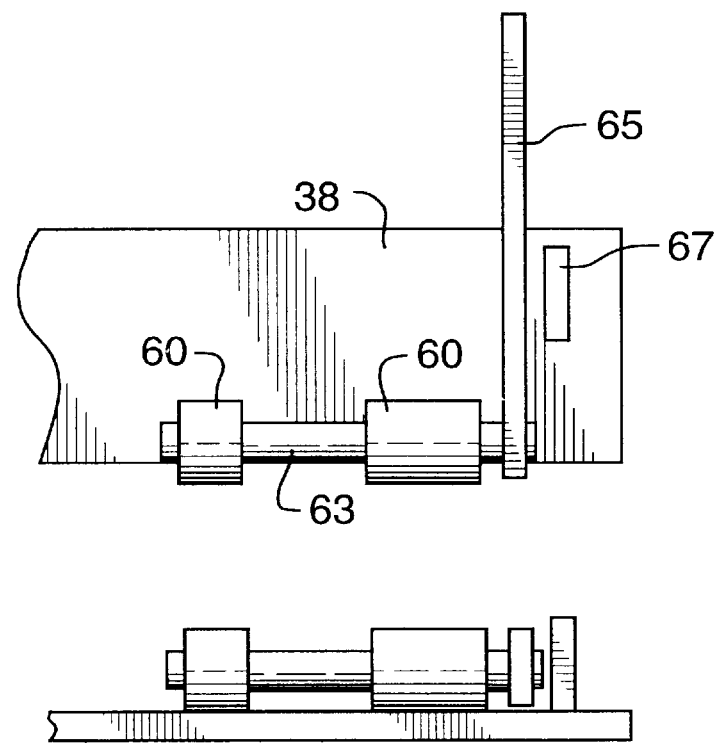
FIG. 17 is a plan view showing details of a hinge pin structure of the apparatus.
Figure 18:
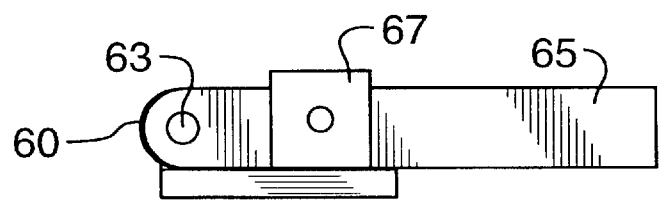
FIG. 18 is a side elevation of the structure of FIG. 17.

FIGS. 17 and 18 show the detailed arrangement of the hinge 40. Bosses 60 are welded to the cross-beam 38, leaving a space between, in which is received the corresponding boss on the piece 58. A hinge pin 63 passes through the bosses, thereby holding the sub-frame 25 to the pivot hinge support 36. The cross-beam 38 of the support is bolted to the floor of the truck, as close to the rear edge of the truck as possible; if the hinge were forward of the rear edge, there might be interference with the downward tipping of the deck when the deck is rolled out.

To prevent theft of the apparatus, the hinge pin 63 is welded to an arm 65, which lies alongside a lug 67 when the pin is in place. A padlock can be passed through aligned holes in the arm and lug.

When the padlock is not present, it will be noted that it is a simple matter to withdraw the hinge pin 63. With the pin extracted, the sub-frame and the deck-frame can then be removed, as a unit, from the truck. The pivot hinge support structure 38 remains bolted to the rear edge of the bed of the truck, but that structure too may be easily removed.

The front end of the sub-frame is not secured to the deck. When the snowmobile or other load is present on the deck, in the truck, then if the bed of the truck, and the members of the sub-frame, were perfectly flat, the sub-frame might lie perfectly flat on the bed. In practice, the sub-frame is supported at four points, i.e at the two hinges 40, and at two other points, one on each member of the sub-frame, more or less towards the front of the member, upon which the sub-frame rests on the bed of the truck.

If the two members of the sub-frame are not quite parallel at this time, there is no great difficulty. Neither the sub-frame nor the deck are inherently rigid, in the twist-sense, and these structures can easily twist slightly to allow the left and right rollers still to move quite freely, even though not quite parallel.

It may be noted that the deck-frame would normally be surmounted by a piece of e.g plywood, of suitable size. (The piece is shown in the drawings). The rigidity of the piece of material of course contributes to the rigidity of the deck.

As shown in FIG. 3, the winch cable 45 is attached to the sub-frame at a central or intermediate point of the cross-bar 47. If the problem should arise that the sub-frame's lack of rigidity becomes a hindrance to performance, instead of having the winch cable attached in the centre of the front cross-bar of the sub-frame as shown in FIG. 3, an arrangement may be provided whereby, at least functionally, the winch cable is divided into two, and attached separately to the front ends of the two members of the sub-frame. Thus, the front ends of the two members would be constrained to be raised and lowered at the same rate by the winch, even if the sub-frame had little anti-twist rigidity.

The roller wheel assemblies, on the other hand, do require to be kept reasonably accurately upright in the guide rails, or they may jam. That is why the wheels are mounted in the square tubes 54. The tubes are rigid enough to ensure that the wheels can hardly deflect from being square-on to the aluminum extrusions from which the frame members are formed, even when a heavy load is present on the deck. Simply attaching the axles of the wheels directly to the extrusion would not be good enough to cope with heavy loads.

The fact that the hinge is formed as a part of the same structure that includes the rigid square tube serves to ensure also that the hinge pin 63 is not subjected to twisting or bending, but only has to cope with straight sheer forces. The holes in the bosses 60 can be generated at the same time as the holes for the roller axles, which also helps to keep the pins straight.

Figure 19:
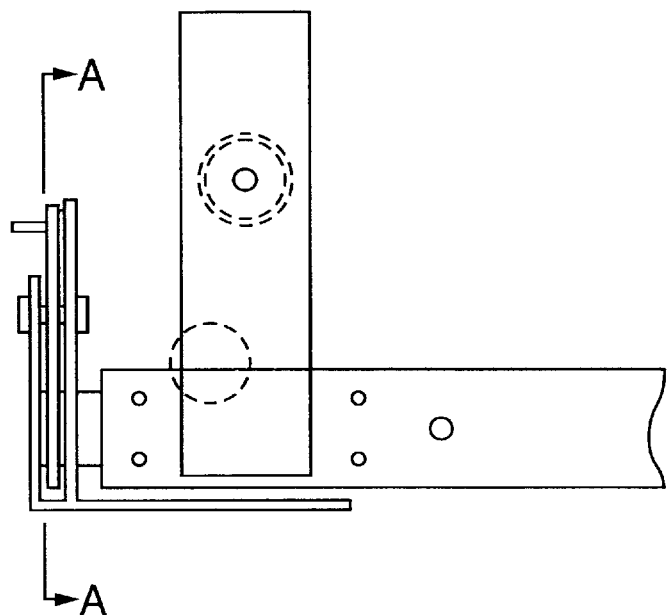
FIGS. 19 and 19A are an elevation of a latch structure of the apparatus.
Figure 19A:
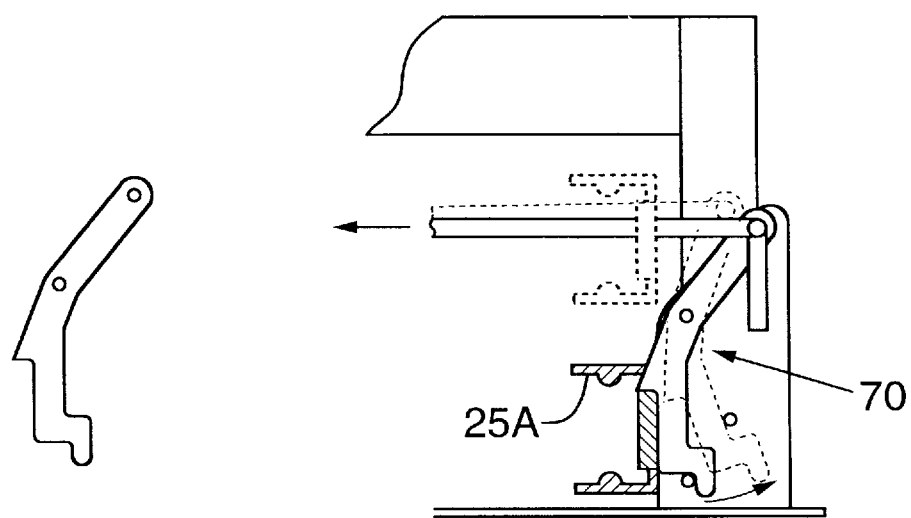

A latch 70 is provided at the front end of the sub-frame 25, to latch the sub-frame in the "down" position, after the sub-frame has been made horizontal by the action of the winch 43. FIG. 19A is a view of the latch, looking forwards towards the cab. The latch is spring-loaded and self-activating, with provision for manual release.

Figure 20:
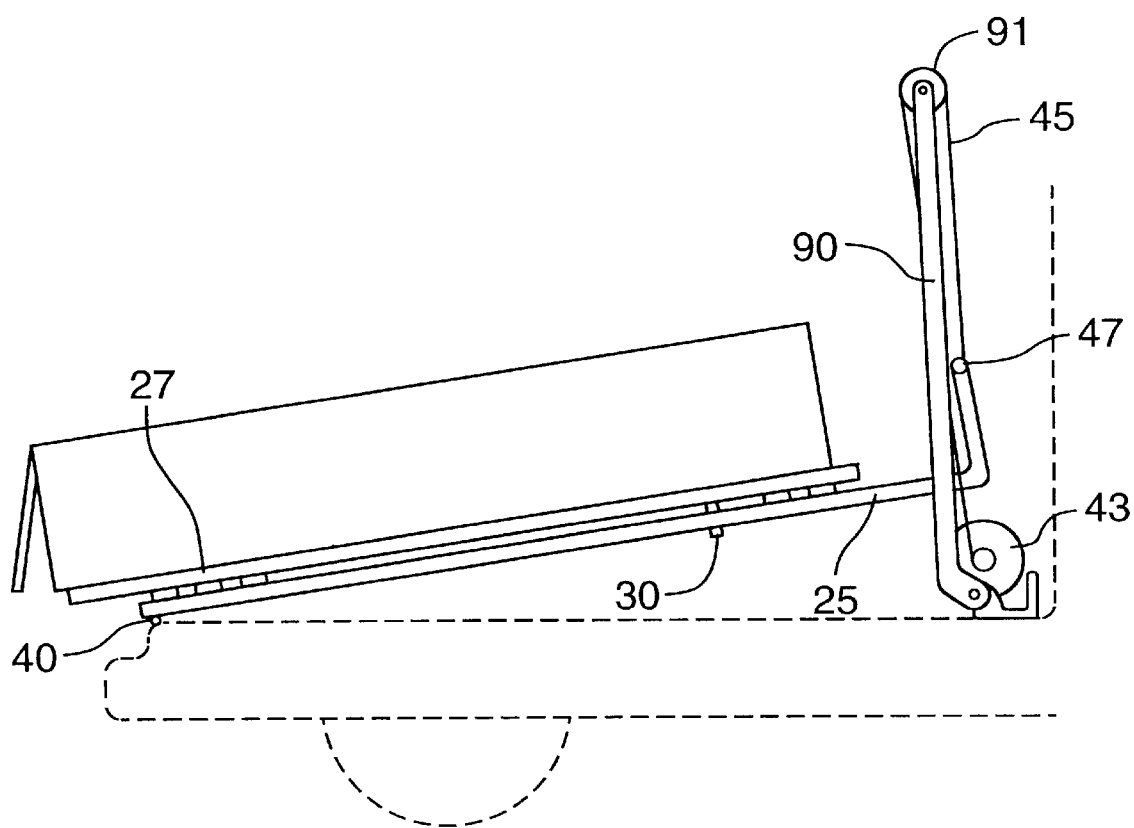
FIG. 20 is diagram showing the operation of the apparatus as a dumper truck.

The apparatus may be used as a dumper-truck. FIG. 20 shows a suitable arrangement. In FIG. 20, a mast 90 carries a pulley 91 at the top. Cable 45 from the winch 43 passes over the pulley, and is secured to the cross-bar 47 of the deck-frame. Thus, when the winch is operated, the cross-bar rises, thereby causing the deck-frame 27 and the sub-frame 25 to tilt about the hinge 40. For operation in the dumper mode, the deck-frame 27 is not extended out from the sub-frame, but remains latched at the forward end of the sub-frame; except that, when the load is very heavy, it may be preferred to extend the deck out a short distance, whereby some of the load is transferred onto the hinge, whereby the tension in the cable needed to lift the front of the deck is reduced. For dumping granular material (e.g soil etc), it may be preferred to secure a box or other container to the deck. When not in use, the mast 90 may be folded down, and laid flat on the bed of the truck, underneath the sub-frame.

I claim:

1. Deck apparatus for use with a truck, wherein:

the apparatus includes a sub-frame, and includes a means for mounting the sub-frame to a floor of the truck, by way of a pivot hinge;

the pivot hinge is located at or close to the rear of the sub-frame, the axis of the hinge being horizontal and lateral with respect to the truck;

the structural arrangement of the pivot hinge is such that the sub-frame can pivot between a stowed position in which the sub-frame lies flat and horizontal, and a tilted position, in which the sub-frame is tilted, whereby a front portion of the sub-frame is raised above a rear portion of the sub-frame;

the apparatus includes a deck-frame, and includes a guide means;

the guide means is so structured as to be effective, in operation of the apparatus, to guide the deck-frame for movement relative to the sub-frame, being in-out telescoping movement in the longitudinal direction relative to the truck;

the guide means is so structured as to be effective to constrain the deck-frame against all other modes of movement of the deck-frame other than the said telescoping relative to the sub-frame, whereby, when the sub-frame undergoes tilting movement about the hinge pivot, the deck-frame follows that same tilting movement;

the deck-frame includes left and right elongate longitudinal structural deck-frame members, secured underneath a deck panel;

the sub-frame includes left and right elongate longitudinal structural sub-frame members, and the sub-frame members lie in a parallel-alongside relationship with the deck-frame members;

the guide means includes profiled tracks formed in the left and right sub-frame members, being a left profiled track in the left sub-frame member and a right profiled track in the right sub-frame member;

the guide means includes left and right front rollers, which are bearinged to the deck-frame at the front of the deck-frame, respectively to the left and right of the deck-frame;

in respect of the left-front-roller, the roller is formed with a circumferential groove, the left-front-roller being provided with surfaces that define left and right side walls of the groove;

the left profiled track, being the track formed in the left sub-frame member, includes a promontory, the promontory being provided with surfaces that define left and right side walls of the promontory;

the left and right side walls of the promontory of the left track are complementary to the left and right side walls of the groove in the left roller, to the extent that, when the left roller runs on the left track, the left roller is constrained, by the engagement of the left and right side walls of the groove with the left and right side walls of the promontories, against both left and right movement laterally away from the left track;

in respect of the right-front-roller, the roller is formed with a circumferential groove, the right-front-roller being provided with surfaces that define left and right side walls of the groove;

the right profiled track, being the track formed in the right sub-frame member, includes a promontory, the promontory being provided with surfaces that define left and right side walls of the promontory;

the left and right side walls of the promontory of the right track are complementary to the left and right side walls of the groove in the right roller, to the extent that, when the right roller runs on the right track, the right roller is constrained, by the engagement of the left and right side walls of the groove with the left and right side walls of the promontories, against both left and right movement laterally away from the right track;

the left profiled track is channel-shaped, having upper and lower flanges, and the promontory is formed in the lower flange thereof, and a corresponding promontory is formed in the upper flange thereof.

the right profiled track is channel-shaped, having upper and lower flanges, and the promontory is formed in the lower flange thereof, and a corresponding promontory is formed in the upper flange thereof.

2. Apparatus of claim 1, wherein the apparatus includes a winch means, which is effective, when operated, to raise and lower the sub-frame between the stowed position and the tilted position.

3. Apparatus of claim 2, wherein:

the apparatus includes a mast, located at the front end of the deck-frame, the mast having a pulley thereon, whereby a cable from the winch means can be used for raising the front end of the deck-frame for operation of the apparatus in a dumper truck mode;

and the mast is hinged to the bed of the truck, and folds flat on the bed when not in use.

4. Apparatus of claim 1, wherein:

each roller is carried on a bearing pin;

the apparatus includes a relatively short hollow-cross-section reinforcing component, which is secured lengthwise to one of the elongate longitudinal frame members;

and the bearing pin bridges opposite side walls of the hollow component.

5. Apparatus of claim 4, wherein:

the apparatus includes an operable locking means for locking the two frames together, whereby the frames are constrained against telescoping when the locking means is operated;

the locking means comprises a lock-pin, mounted on a member of one of the frames, which is engageable with a corresponding hole in a member of the other of the frames when the locking means is operated;

the hollow component carries a tube, which bridges opposite side walls of the hollow component;

the lock-pin is slidable in the tube, for operation of the locking means;

the tube is disposed, in the hollow component, in close adjacency to the bearing pin.

6. Apparatus of claim 1, wherein:

the apparatus includes an operable locking means for locking the two frames together, whereby the frames are constrained against telescoping when the locking means is operated;

the locking means comprises a lock-pin, mounted on a member of one of the frames, which is engageable with a corresponding hole in a member of the other of the frames when the locking means is operated.

7. Apparatus of claim 1, wherein the apparatus includes a latch, for locking the front end of the deck-frame to the truck bed.

8. Apparatus of claim 1, wherein the sub-frame lacks inherent rigidity.

9. Apparatus of claim 1, wherein the left and right sub-frame longitudinal members are aluminum extrusions;

the left and right members have the same extruded profile, and the extruded profile is symmetrical about a horizontal axis of the profile.

10. Apparatus of claim 9, wherein:

the left and right deck-frame longitudinal members are aluminum extrusions of the same extruded profile as the sub-frame members;

and the apparatus Includes left and right rear rollers, which are bearinged to the sub-frame at the rear of the sub-frame, and which are constrained to run in the profiled tracks of the deck-frame members.

* * * * *